US012614722B2

(12) United States Patent
Wang et al.

(10) Patent No.: US 12,614,722 B2
(45) Date of Patent: Apr. 28, 2026

(54) VOLTAGE CONTROL STRATEGY FOR BATTERIES INCLUDING LITHIUM- AND MANGANESE-RICH (LMR) CATHODES

(71) Applicant: GM GLOBAL TECHNOLOGY OPERATIONS LLC, Detroit, MI (US)

(72) Inventors: Lei Wang, Rochester Hills, MI (US); Jiazhi Hu, Rochester Hills, MI (US); Meng Jiang, Rochester Hills, MI (US); Gongshin Qi, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 497 days.

(21) Appl. No.: 18/309,913

(22) Filed: May 1, 2023

(65) Prior Publication Data

US 2024/0372086 A1 Nov. 7, 2024

(51) Int. Cl.
*H01M 4/505* (2010.01)
*H01M 10/0525* (2010.01)
*H01M 4/02* (2006.01)

(52) U.S. Cl.
CPC ....... *H01M 4/505* (2013.01); *H01M 10/0525* (2013.01); *H01M 2004/027* (2013.01); *H01M 2004/028* (2013.01)

(58) Field of Classification Search
CPC ............. H01M 4/505; H01M 10/0525; H01M 2004/027; H01M 2004/028
USPC ...................................................... 429/218.1
See application file for complete search history.

(56) References Cited

U.S. PATENT DOCUMENTS

2020/0335980 A1* 10/2020 Aronov ................. H01M 10/48
2022/0352511 A1 11/2022 Qi et al.
2023/0048577 A1 2/2023 Qi et al.
2023/0129069 A1 4/2023 Qi et al.

FOREIGN PATENT DOCUMENTS

DE 102010027864 A1 12/2011

OTHER PUBLICATIONS

Wang et al. Lithium- and Manganese-Rich Oxide Cathode Materials for High-Energy Lithium Ion Batteries. Adv. Energy Mater., vol. 6, 2016, pp. 1600906. Retrieved from https://advanced.onlinelibrary. wiley.com/doi/epdf/10.1002/aenm.201600906 (Year: 2016).*
U.S. Appl. No. 17/742,037, filed May 11, 2022, Qi et al.
U.S. Appl. No. 17/853,363, filed Jun. 29, 2022, Wang et al.
U.S. Appl. No. 17/882,936, filed Aug. 8, 2022, Qi et al.
U.S. Appl. No. 17/897,959, filed Aug. 29, 2022, Jiang et al.
U.S. Appl. No. 17/976,400, filed Oct. 28, 2022, Wang et al.
U.S. Appl. No. 17/978,462, filed Nov. 1, 2022, Wang et al.
U.S. Appl. No. 18/102,836, filed Jan. 30, 2023, Wang.
German Office Action from counterpart DE102023130012.1, dated Dec. 17, 2025.

* cited by examiner

*Primary Examiner* — James M Erwin

(57) ABSTRACT

A method for controlling a battery includes operating a lithium- and manganese-rich (LMR) battery within a first voltage window defined by an upper cutoff voltage threshold and a lower cutoff voltage threshold; monitoring a battery capacity of the LMR battery; and in response to the battery capacity of the LMR battery falling below a predetermined battery capacity, changing the first voltage window to a second voltage window by reducing the lower cutoff voltage threshold by a predetermined voltage value.

19 Claims, 7 Drawing Sheets

VOLTAGE CONTROL STRATEGY FOR BATTERIES INCLUDING LITHIUM- AND MANGANESE-RICH (LMR) CATHODES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to voltage control systems and methods for batteries, and more particularly to voltage control systems and methods for batteries including lithium- and manganese-rich (LMR) cathodes.

Electric vehicles (EVs) such as battery electric vehicles (BEVs), hybrid vehicles, and/or fuel cell vehicles include one or more electric machines and a battery system including one or more battery cells, modules and/or packs. A battery control module is used to control charging and/or discharging of the battery system during charging and/or driving. Manufacturers of EVs are pursuing increased power density to increase the range of the EVs.

SUMMARY

A method for controlling a battery includes operating a lithium- and manganese-rich (LMR) battery within a first voltage window defined by an upper cutoff voltage threshold and a lower cutoff voltage threshold; monitoring a battery capacity of the LMR battery; and in response to the battery capacity of the LMR battery falling below a predetermined battery capacity, changing the first voltage window to a second voltage window by reducing the lower cutoff voltage threshold by a predetermined voltage value.

In other features, the predetermined voltage value corresponds to a difference between the lower cutoff voltage threshold and a minimum lower cutoff voltage threshold. The LMR battery includes cathode electrodes and anode electrodes. The cathode electrodes comprise cathode current collectors and cathode active material arranged on at least one side of the cathode current collectors. The cathode active material comprises lithium- and manganese-rich cathode active material.

In other features, the anode electrodes include anode current collectors and anode active material arranged on at least one side of the anode current collectors, and the anode active material comprises one or more materials selected from a group consisting of graphite, silicon, silicon and carbon, silicon oxide, lithium silicon oxide, lithium metal, and combinations thereof.

In other features, the lower cutoff voltage threshold is in a range from 1.5V to 3V. The upper cutoff voltage threshold is in a range from 4V to 5V. In response to the battery capacity of the LMR battery falling below the predetermined battery capacity, the method includes changing the second voltage window to a third voltage window by reducing the lower cutoff voltage threshold by the predetermined voltage value.

In other features, the method includes lowering the lower cutoff voltage threshold by the predetermined voltage value in response to the battery capacity falling below the predetermined battery capacity until the lower cutoff voltage threshold is equal to a minimum lower cutoff voltage threshold. The predetermined voltage value is in a range from 0.05V and 0.5V.

In other features, the method includes reconfiguring connections between a plurality of LMR battery cells of the LMR battery to increase output voltage of the LMR battery in response to the battery capacity falling below the predetermined battery capacity while using a voltage window defined by the upper cutoff voltage threshold and the minimum lower cutoff voltage threshold.

A battery system includes a lithium- and manganese-rich (LMR) battery. A battery control module configured to operate the LMR battery within a first voltage window defined by an upper cutoff voltage threshold and a lower cutoff voltage threshold, monitor a battery capacity of the LMR battery, and in response to the battery capacity of the LMR battery falling below a predetermined battery capacity, change the first voltage window to a second voltage window by reducing the lower cutoff voltage threshold by a predetermined voltage value.

In other features, the predetermined voltage value corresponds to a difference between the lower cutoff voltage threshold and a minimum lower cutoff voltage threshold. The LMR battery includes cathode electrodes and anode electrodes. The cathode electrodes comprise cathode current collectors and cathode active material arranged on at least one side of the cathode current collectors. The cathode active material comprises lithium- and manganese-rich cathode active material.

In other features, the anode electrodes comprise anode current collectors include anode current collectors and anode active material arranged on at least one side of the anode current collectors. The anode active material comprises one or more materials selected from a group consisting of graphite, silicon, silicon and carbon, silicon oxide, lithium silicon oxide, lithium metal, and combinations thereof. The lower cutoff voltage threshold is in a range from 1.5V to 3V. The upper cutoff voltage threshold is in a range from 4V to 5V.

In other features, the battery control module is configured to lower the lower cutoff voltage threshold by the predetermined voltage value in response to the battery capacity falling below the predetermined battery capacity until the lower cutoff voltage threshold is equal to a minimum lower cutoff voltage threshold. The predetermined voltage value is in a range from 0.05V and 0.5V.

In other features, a plurality of switches connected between a plurality of LMR battery cells of the LMR battery. The battery control module is further configured to reconfigure the plurality of LMR battery cells of the LMR battery using the plurality of switches to increase output voltage of the LMR battery in response to the battery capacity falling below the predetermined battery capacity while using a voltage window defined by the upper cutoff voltage threshold and the minimum lower cutoff voltage threshold.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While voltage control of LMR batteries is described in the context of an electric vehicle, the voltage control can be used for LMR batteries in stationary applications and/or in other types of applications.

LMR batteries include anode electrodes, cathode electrodes, and separators arranged in a predetermined sequence. The anode electrodes include an anode current collector and a layer including anode active material arranged on one or both sides of the anode current collector. The cathode electrodes include a cathode current collector and a layer including cathode active material arranged on one or both sides of the cathode current collector. The separators are arranged between the anode and cathode electrodes.

For an LMR battery, the cathode active material includes lithium- and manganese-rich (LMR) cathode active material. A battery system includes one or more LMR battery cells arranged in one or more modules and/or in one or more battery packs.

The LMR batteries have high average operating voltages (e.g., greater than 3.5 V vs. Li/Li+) and high reversible capacities (>200 mAh/g). However, LMR batteries experience capacity fading and voltage decay due to electrolyte consumption and/or the structural transformation from a layered phase to a spinel phase. For LMR batteries, controlling an operating voltage window is important for battery cycle life.

Figure 1:
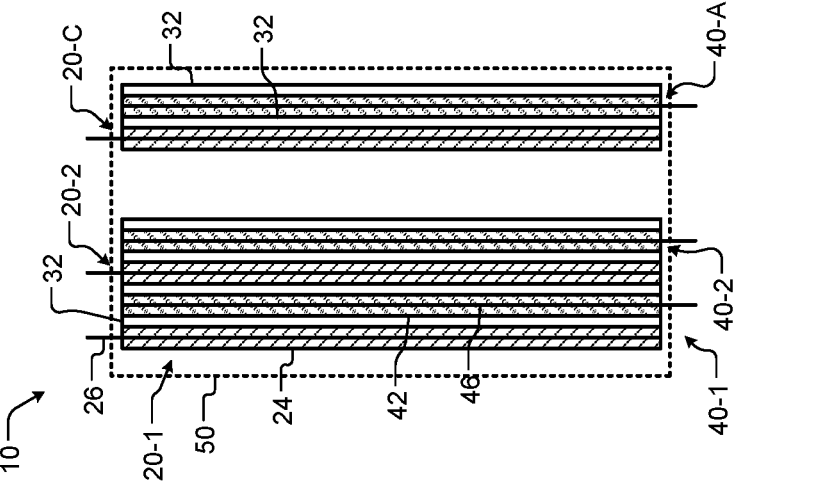
FIG. 1 is a side cross-sectional view of an example of a lithium- and manganese-rich (LMR) battery cell according to the present disclosure.

Referring now to FIG. 1, an LMR battery cell 10 includes cathode electrodes 20-1, 20-2, . . . , and 20-C, where C is an integer greater than one. The cathode electrodes 20 include a cathode active material layer 24 arranged on one or both sides of cathode current collectors 26. The LMR battery cell 10 includes anode electrodes 40-1, 40-2, . . . , and 40-A, where A is an integer greater than one. The anode electrodes 40 include an anode active material layer 46 arranged on one or both sides of anode current collectors 42. The cathode electrodes 20, the anode electrodes 40 and the separators 32 are arranged in a predetermined order in an enclosure 50.

For example, separators 32 are arranged between the cathode electrodes 20 and the anode electrodes 40.

In some examples, the cathode active material comprises lithium- and manganese-rich active material and/or blended cathodes. Blend cathodes include a mixture of at least two different types of cathode active materials (e.g., LMR and lithium nickel manganese cobalt oxides (NCMA or NMC), LMR and lithium ferromanganese phosphate (LMFP), LMR+LMFP+NMCA (NMC), etc.). In some examples, the anode active material comprises graphite, silicon (Si), silicon and carbon (Si/C), silicon oxide ($SiO_x$), lithium silicon oxide ($Li_ySiO_x$), lithium metal, or combinations thereof. In some examples, an N/P ratio is in a range from 1-3.

Figure 2:
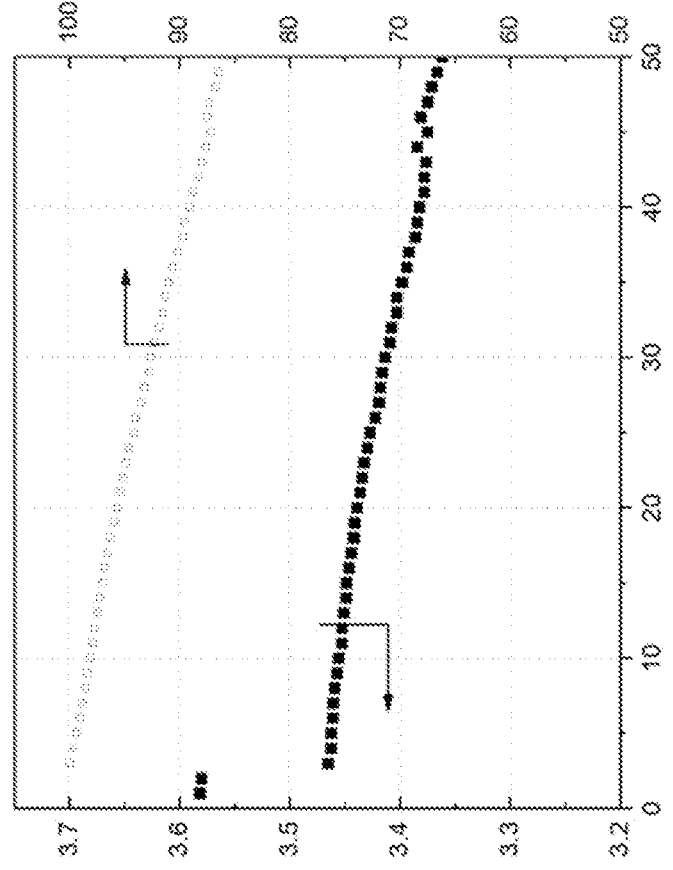
FIG. 2 is a graph illustrating nominal voltage and discharge capacity retention as a function of battery cycles for an LMR battery.

Referring now to FIG. 2, nominal voltage and discharge capacity retention are shown as a function of battery cycles. The nominal voltage falls from 3.47V to 3.36V and discharge capacity retention falls from 100% to 87% over 50 cycles. Therefore, the nominal voltage and discharge capacity retention falls fairly quickly.

Figure 3:
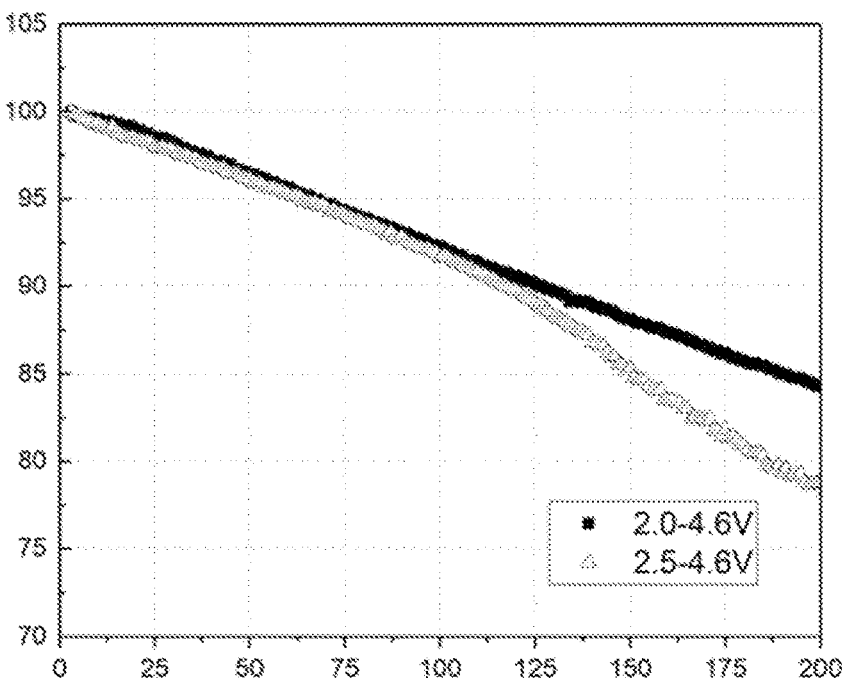
FIG. 3 is a graph illustrating discharge capacity retention as a function of battery cycles using different battery voltage cutoff ranges for an LMR battery according to the present disclosure.
Figure 4:
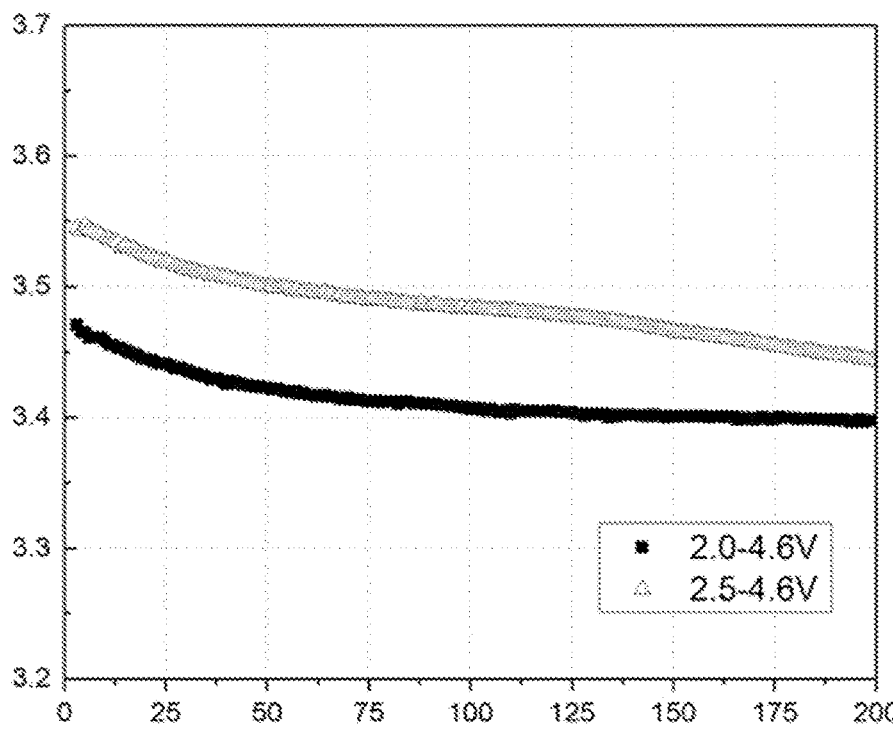
FIG. 4 is a graph illustrating nominal voltage as a function of battery cycles using different battery voltage cutoff ranges for an LMR battery according to the present disclosure.

Referring now to FIGS. 3 and 4, an operating voltage window of the LMR battery impacts both cycle life and nominal voltage of the LMR battery. Usually, the LMR batteries are controlled within a fixed or static voltage window or range defined by an upper cutoff voltage threshold and a lower cutoff voltage threshold. The lower cutoff voltage threshold does not have a significant impact on the capacity retention early in the battery life cycle. After 100 cycles, however, the LMR battery cycling in a range such as 2.5V to 4.6V shows faster capacity fading than the LMR battery cycling in a range from 2.0V to 4.6V due to the voltage decay. The cell cycling at 2.5-4.6V has higher nominal voltage than cycling at 2.0-4.6V.

The voltage control systems and methods for an LMR battery according to the present disclosure adjust the operating voltage window to extend battery cycle life. At the beginning of the battery life, the battery cell operates in a first voltage range between an upper cutoff voltage threshold ($V_{i,UL}$) (e.g., 4.6V) and a lower cutoff voltage threshold ($V_{i,LL}$) (e.g., 2.5V). Periodically (e.g., a predetermined number of cycles) or on an event basis, a battery capacity of the LMR battery is estimated. If the battery capacity of the MLR battery is greater than or equal to a predetermined capacity threshold, the voltage control system continues to operate using the first voltage range.

If the battery capacity of the LMR battery is less than the predetermined capacity threshold, the lower cutoff voltage threshold is decreased. In some examples, the lower cutoff voltage threshold is lowered in a single step to a minimum lower cutoff voltage threshold (e.g., 2.0V). In other examples, the lower cutoff voltage threshold is slowly decreased in fixed or variable increments (e.g., 0.2V, 0.1V, 0.05V, etc.) (e.g., a delta voltage (dV)) (e.g., from 2.5V to 2.4V to 2.3V to 2.2V to 2.1V to 2.0V). When the final lower cutoff voltage threshold is reached, the lower cutoff voltage threshold is not decreased further.

A size of the incremental voltage or dV can be fixed or variable (e.g., determined by driving conditions (power/voltage requirements)). In some examples, the battery capacity is checked after reducing the lower cutoff voltage threshold to verify that the battery capacity is higher than the threshold value. If true, the LMR battery is operated using the new voltage window (between the upper cutoff voltage threshold and a reduced lower cutoff voltage threshold). If false, the lower cutoff voltage threshold is reduced again.

Figure 5A:
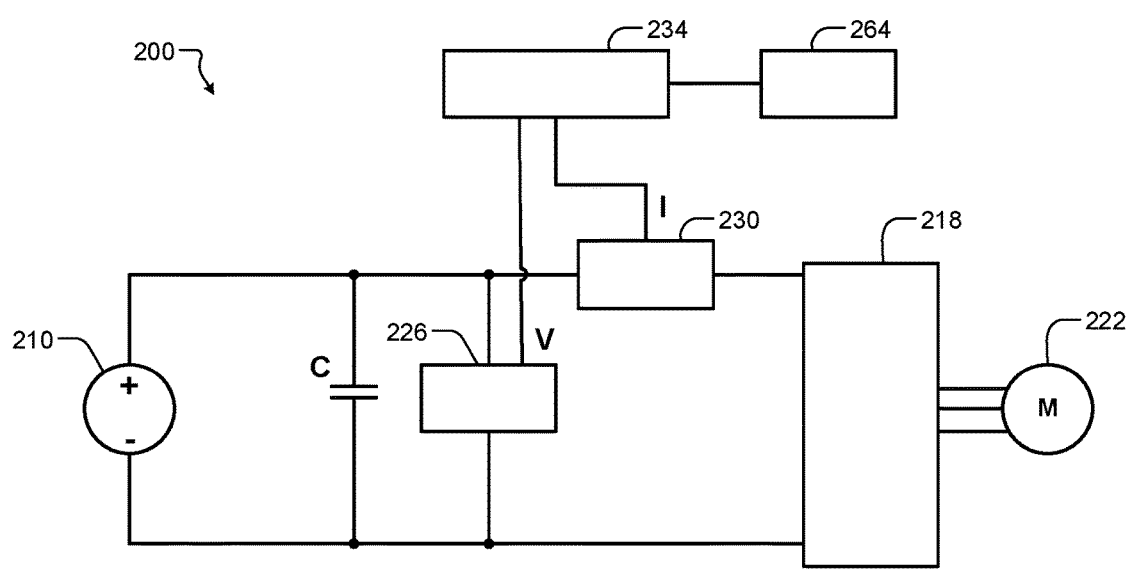
FIG. 5A is a functional block diagram of a battery management system for an LMR battery according to the present disclosure.

Referring now to FIG. 5A, a battery system 200 includes an LMR battery 210 including one or more LMR battery cells, modules, and/or packs. The LMR battery 210 is connected to a power inverter 218 that inverts/rectifies power to/from an electric motor 222 and includes an array of power switches (not shown). The power inverter 218 supplies power to the electric motor 222 to provide propulsion power for the EV and receives power from the electric motor 222 during regeneration. A capacitor C may be arranged across terminals of the LMR battery 210. One or more current sensors 230 may be used to sense current supplied by the LMR battery cells of the LMR battery 210 individually or on a pack or module basis. One or more voltage sensors 226 may be used to sense voltage supplied by the LMR battery cells of the LMR battery 210 individually or on a pack or module basis.

If the LMR battery pack voltage is below the requirement of the battery control module 234, the LMR battery cells can be regrouped using switches 264 to have more in-series battery cell groups to increase the module/pack level output voltage.

Figure 5B:
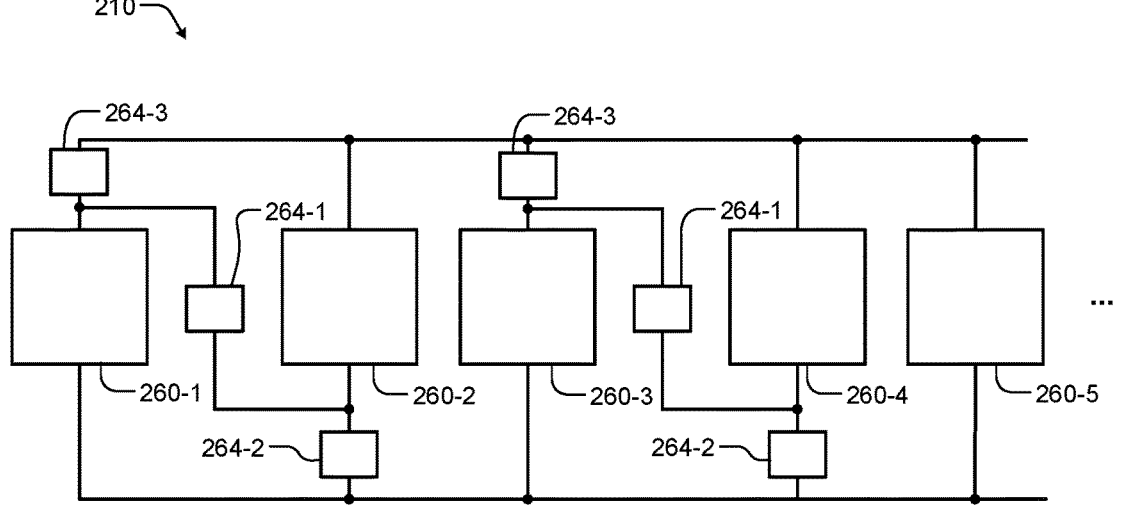
FIGS. 5B to 5D are functional block diagrams of reconfigurable LMR battery units according to the present disclosure.
Figure 5C:
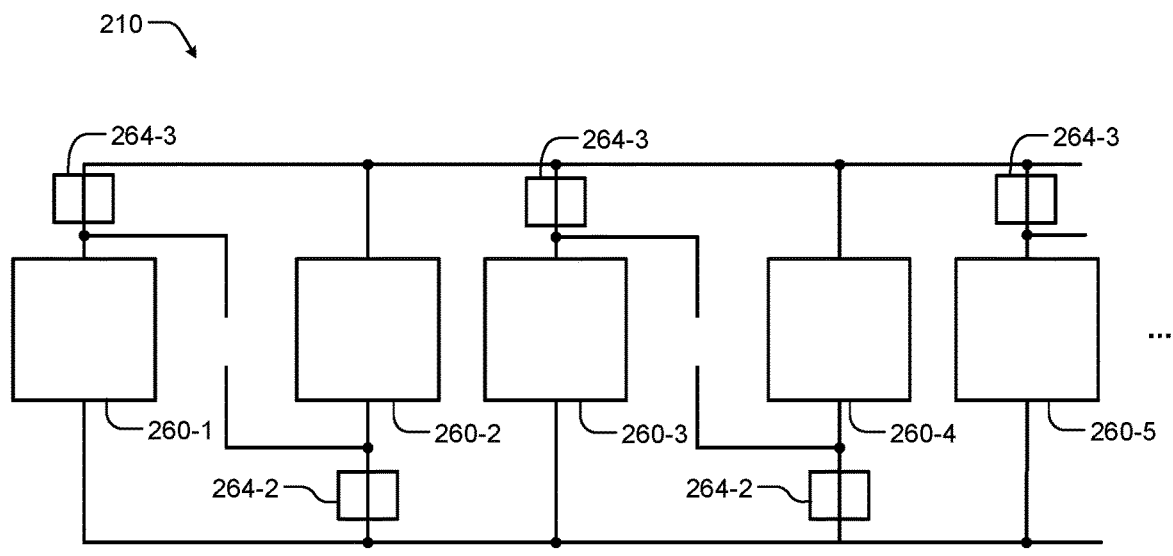
Figure 5D:
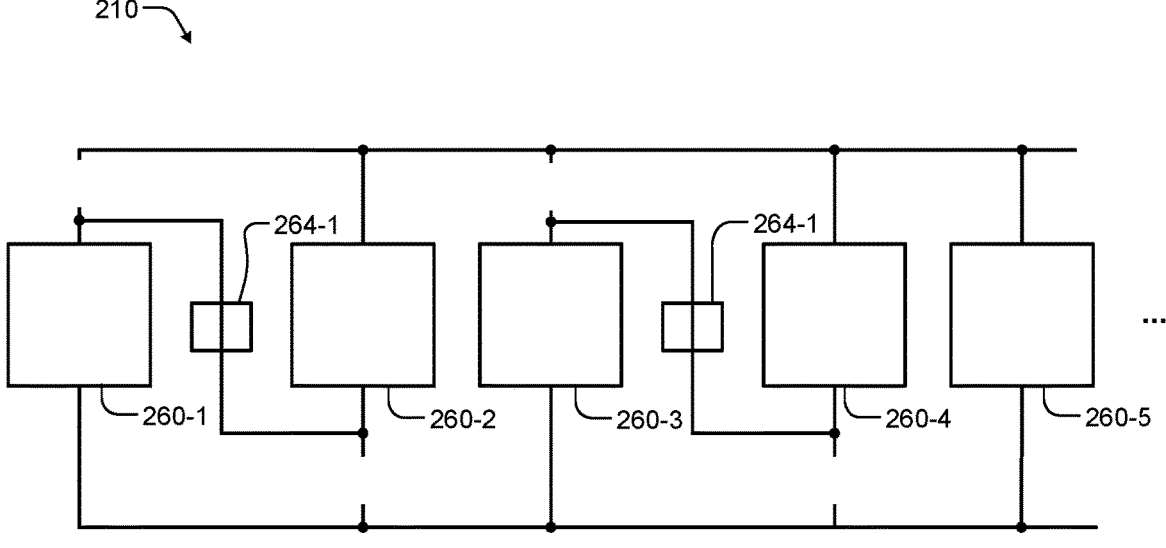

Referring now to FIGS. 5B to 5D, an example of the use of the switches 264 is shown. In FIG. 5B, each LMR battery unit 260-1, 260-2, 260-3, . . . , includes one LMR battery cells or modules or two or more LMR battery cells or modules connected in series and/or parallel. The LMR battery units 260-1, 260-2, 260-3, . . . , are connected in parallel as shown.

The switches 264 include switches 264-1, 264-2, and 264-3 for pairs of the LMR battery units (e.g., 260-1 and 260-2, 260-3 and 260-4, etc.). In FIG. 5C, during early battery life, the switches 264-2 and 264-3 are closed and 264-1 is open such that the one or more LMR battery units 260-1, 260-2, 260-3, . . . , are connected in parallel.

After the lower cutoff voltage threshold is lowered to the minimum lower cutoff voltage threshold as described above, the configuration of the switches 264 is changed when the battery capacity falls below the predetermined battery capacity again. In some examples, the switches 264-2 and 264-3 are opened and the switches 264-1 are closed as shown in FIG. 5D to connect adjacent pairs of the LMR battery cell(s) in series rather than in parallel to double the voltage output of the LMR battery cell(s) pairs (e.g., 260-1 and 260-2; 260-3 and 260-4; etc.). While a specific reconfiguration is shown for illustration purposes, other parallel and/or series combinations can be used.

Figure 6A:
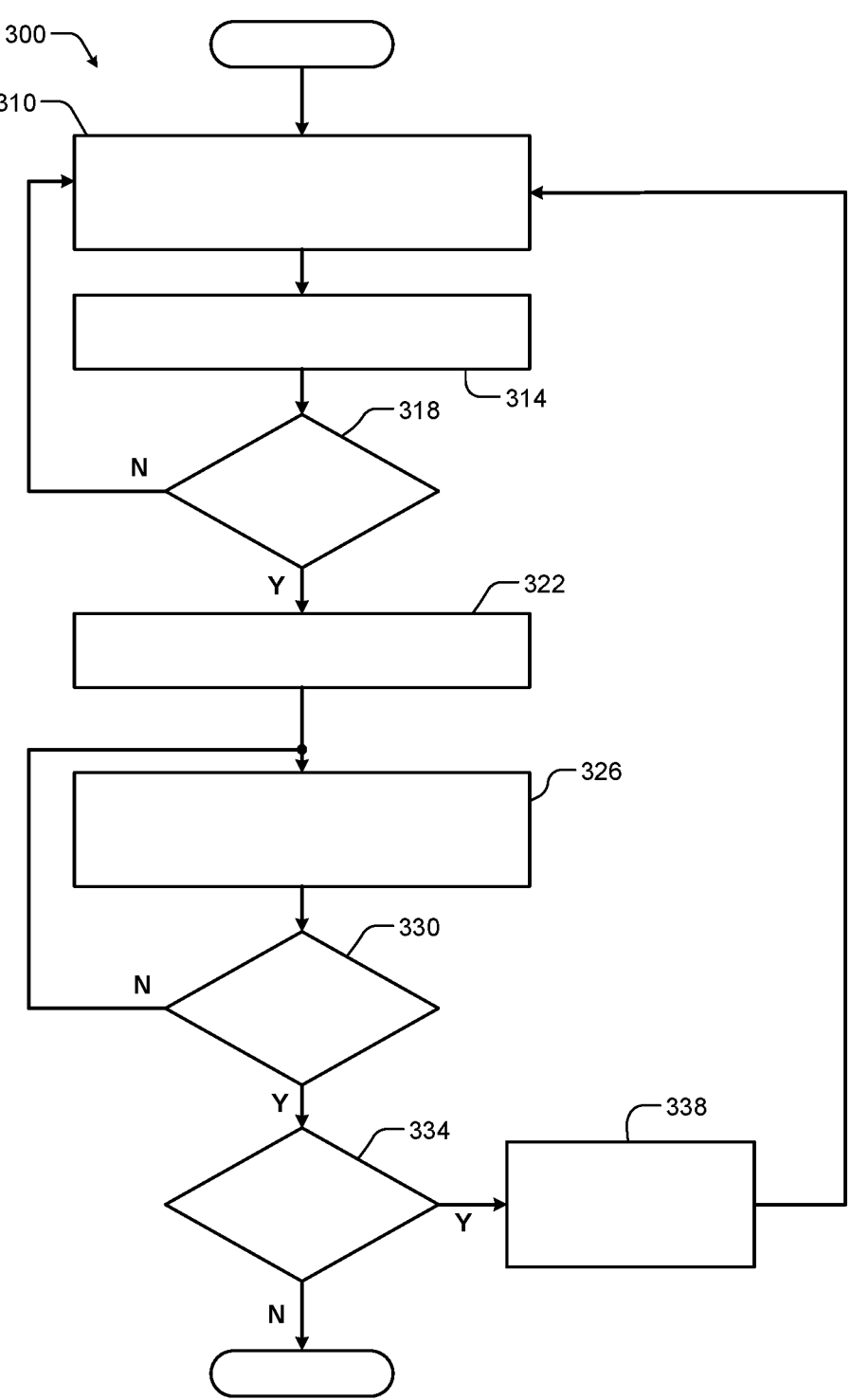
FIGS. 6A and 6B are examples of methods for varying a voltage window for an LMR battery according to the present disclosure.

Referring now to FIG. 6A, a voltage control method 300 includes operating the LMR battery within a first voltage window between an upper cutoff voltage threshold and a lower cutoff voltage threshold. At 314, the battery capacity is determined. In some examples, the battery capacity is determined by a model or lookup table based on state of charge (SOC) and/or other battery parameters including voltage, current, temperature, etc.

At 318, the method determines whether the battery capacity is less than a predetermined battery capacity threshold. If 318 is false, the method returns to 310. If 314 is true, the method reduces the lower cutoff threshold at 322. At 326, the battery is operated a second voltage window defined by the upper cutoff voltage threshold and second lower cutoff voltage threshold.

At 330, the method determines whether the battery capacity is less than a battery capacity threshold. If 330 is false, the method returns to 326. If 330 is true, the method optionally determines whether the LMR battery should be reconfigured at 334. If 334 is true, the method optionally reconfigures the LMR battery at 338 by changing states of the switches and the method returns to 310. As can be appreciated, the voltage window can be the original voltage window or the voltage window with the second lower cutoff voltage threshold or another voltage window can be used after reconfiguration.

Figure 6B:
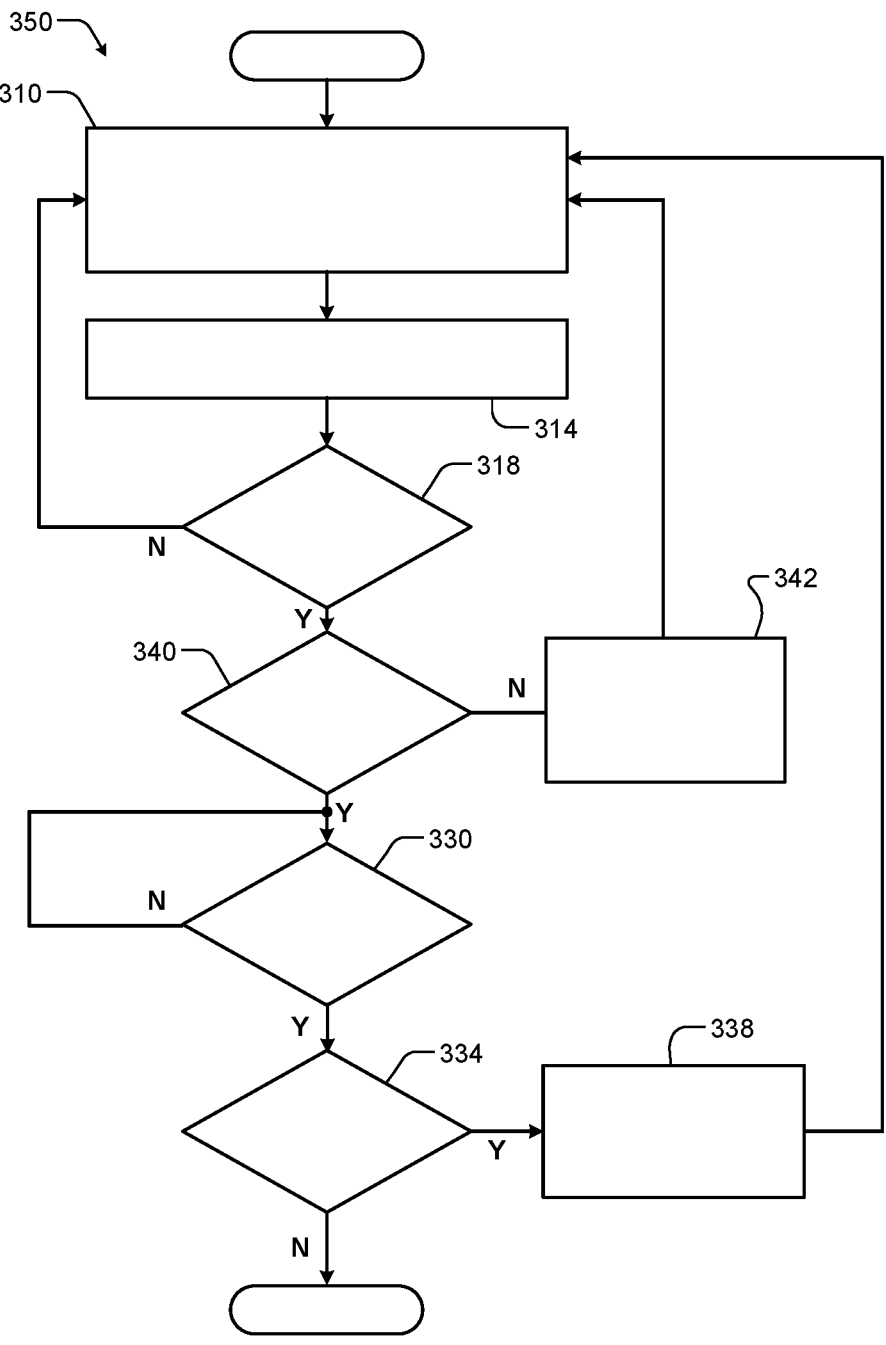

Referring now to FIG. 6B, a method 350 incrementally lowers the lower cutoff voltage in one or more steps in response to the battery capacity being less than the predetermined battery capacity. At 314, the battery capacity is determined. If the battery capacity is less than the predetermined battery capacity threshold, the method determines whether the lower cutoff voltage is at a minimum value at 340. If 340 is false, the method reduces the lower cutoff voltage threshold incrementally by a predetermined value at 342 and control returns to 310. If 340 is true, the method optionally reconfigures the LMR battery using switches as described above.

In some examples, a voltage window is in a range from 2.0-5.0V. A C-rate of the LMR battery is in a range from C/100 to 6 C. A lower cutoff voltage threshold ($V_{i,LL}$) is in a range from 1.5-3V. An upper cutoff voltage threshold ($V_{i,UL}$) is in a range from 4-5V. If used, the incremental voltage dV is in a range from 0.05V to 0.5V.

Figure 7:
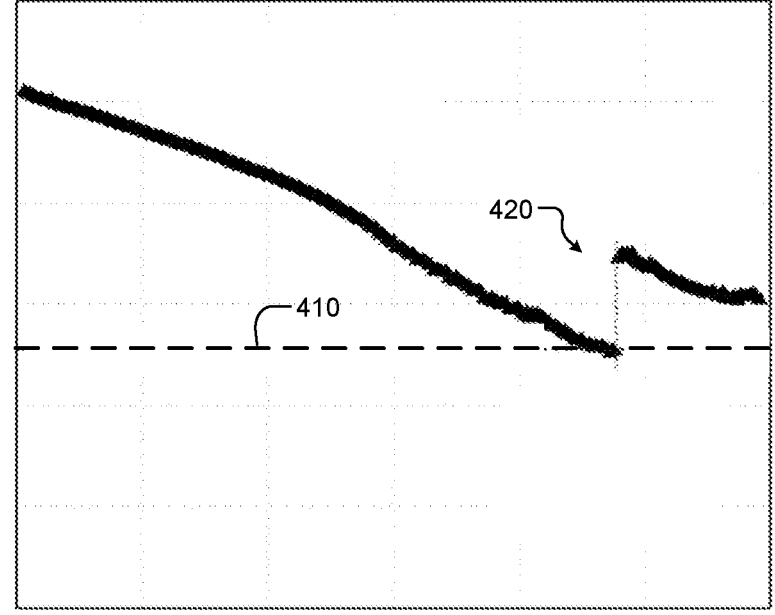
FIG. 7 is a graph illustrating battery capacity as a function of battery life using different voltage windows according to the present disclosure.

Referring now to FIG. 7, a battery capacity threshold 410 is shown. As the battery operates, the battery capacity falls as a function of battery life. When the battery capacity falls below the battery capacity threshold 410, the voltage control systems and methods adjust the lower cutoff voltage threshold and operates the battery using the new lower cutoff voltage threshold. In this example, a single change to the voltage window is show.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for controlling a battery, comprising:
operating a lithium- and manganese-rich (LMR) battery within a first voltage window for a predetermined quantity of battery cycles, wherein the first voltage window is defined by an upper cutoff voltage threshold and a first lower cutoff voltage threshold;
monitoring a battery capacity of the LMR battery; and
in response to the battery capacity of the LMR battery falling below a predetermined battery capacity after the predetermined quantity of battery cycles, changing the first voltage window to a second voltage window by reducing the first lower cutoff voltage threshold by a predetermined voltage value to a second lower cutoff voltage threshold.

2. The method of claim 1, wherein the predetermined voltage value corresponds to a difference between the first lower cutoff voltage threshold and a minimum lower cutoff voltage threshold.

3. The method of claim 1, wherein
the LMR battery includes cathode electrodes and anode electrodes,
the cathode electrodes comprise cathode current collectors and cathode active material arranged on at least one side of the cathode current collectors, and
the cathode active material comprises lithium- and manganese-rich cathode active material.

4. The method of claim 3, wherein:
the anode electrodes include anode current collectors and anode active material arranged on at least one side of the anode current collectors, and the anode active material comprises one or more materials selected from a group consisting of graphite, silicon, silicon and carbon, silicon oxide, lithium silicon oxide, lithium metal, and combinations thereof.

5. The method of claim 1, wherein the first lower cutoff voltage threshold is in a range from 1.5V to 3V and the predetermined quantity of battery cycles is 100 battery cycles.

6. The method of claim 1, wherein the upper cutoff voltage threshold is in a range from 4V to 5V.

7. The method of claim 1, further comprising:

in response to the battery capacity of the LMR battery falling below the predetermined battery capacity after the predetermined quantity of battery cycles, changing the second voltage window to a third voltage window by reducing the second lower cutoff voltage threshold by the predetermined voltage value to a third lower cutoff voltage.

8. The method of claim 1, further comprising lowering the first lower cutoff voltage threshold by the predetermined voltage value in response to the battery capacity falling below the predetermined battery capacity until the second lower cutoff voltage threshold is equal to a minimum lower cutoff voltage threshold.

9. The method of claim 8, wherein the predetermined voltage value is in a range from 0.05V and 0.5V.

10. A method for controlling a battery, comprising:

operating a lithium- and manganese-rich (LMR) battery within a first voltage window defined by an upper cutoff voltage threshold and a lower cutoff voltage threshold;

monitoring a battery capacity of the LMR battery;

in response to the battery capacity of the LMR battery falling below a predetermined battery capacity, changing the first voltage window to a second voltage window by reducing the lower cutoff voltage threshold by a predetermined voltage value;

lowering the lower cutoff voltage threshold by the predetermined voltage value in response to the battery capacity falling below the predetermined battery capacity until the lower cutoff voltage threshold is equal to a minimum lower cutoff voltage threshold; and reconfiguring connections between a plurality of LMR battery cells of the LMR battery to increase output voltage of the LMR battery in response to the battery capacity falling below the predetermined battery capacity while using a voltage window defined by the upper cutoff voltage threshold and the minimum lower cutoff voltage threshold, wherein the predetermined voltage value is in a range from 0.05V and 0.5V.

11. A battery system, comprising:

a lithium- and manganese-rich (LMR) battery;

a battery control module configured to:

operate the LMR battery within a first voltage window for at least 100 battery cycles, wherein the first voltage window is defined by an upper cutoff voltage threshold and a lower cutoff voltage threshold;

monitor a battery capacity of the LMR battery; and in response to the battery capacity of the LMR battery falling below a predetermined battery capacity after the at least 100 battery cycles, changing the first voltage window to a second voltage window by reducing the lower cutoff voltage threshold by a predetermined voltage value.

12. The battery system of claim 11, wherein the predetermined voltage value corresponds to a difference between the lower cutoff voltage threshold and a minimum lower cutoff voltage threshold.

13. The battery system of claim 11, wherein:

the LMR battery includes cathode electrodes and anode electrodes, the cathode electrodes comprise cathode current collectors and cathode active material arranged on at least one side of the cathode current collectors, and the cathode active material comprises lithium- and manganese-rich cathode active material.

14. The battery system of claim 13, wherein:

the anode electrodes comprise anode current collectors include anode current collectors and anode active material arranged on at least one side of the anode current collectors, and the anode active material comprises one or more materials selected from a group consisting of graphite, silicon, silicon and carbon, silicon oxide, lithium silicon oxide, lithium metal, and combinations thereof.

15. The battery system of claim 11, wherein the lower cutoff voltage threshold is in a range from 1.5V to 3V.

16. The battery system of claim 11, wherein the upper cutoff voltage threshold is in a range from 4V to 5V.

17. The battery system of claim 11, wherein the battery control module is configured to lower the lower cutoff voltage threshold by the predetermined voltage value in response to the battery capacity falling below the predetermined battery capacity until the lower cutoff voltage threshold is equal to a minimum lower cutoff voltage threshold.

18. The battery system of claim 17, wherein the predetermined voltage value is in a range from 0.05V and 0.5V.

19. The battery system of claim 17, further comprising:

a plurality of switches connected between a plurality of LMR battery cells of the LMR battery, wherein the battery control module is further configured to reconfigure the plurality of LMR battery cells of the LMR battery using the plurality of switches to increase output voltage of the LMR battery in response to the battery capacity falling below the predetermined battery capacity while using a voltage window defined by the upper cutoff voltage threshold and the minimum lower cutoff voltage threshold.

* * * * *